US006751787B1

(12) United States Patent
Blaszczak et al.

(10) Patent No.: US 6,751,787 B1
(45) Date of Patent: Jun. 15, 2004

(54) GRAPHICAL PROGRAMMING LANGUAGE FOR REPRESENTATIONS OF CONCURRENT OPERATIONS

(75) Inventors: Bogdan Blaszczak, Coppell, TX (US); Myra Hambleton, Plano, TX (US); Eric Weeren, Plano, TX (US); Ellis K. Cave, Plano, TX (US)

(73) Assignee: Intervoice Limited Partnership, Reno, NV (US)

( * ) Notice: Subject to any disclaimer, the term of this patent is extended or adjusted under 35 U.S.C. 154(b) by 456 days.

(21) Appl. No.: 09/687,296

(22) Filed: Oct. 13, 2000

(51) Int. Cl.[7] .................................................. G06F 9/44
(52) U.S. Cl. ....................................... 717/105; 717/109
(58) Field of Search ................................. 717/106–109, 717/104–105, 100, 113; 345/967

(56) References Cited

U.S. PATENT DOCUMENTS

| 4,860,204 A | | 8/1989 | Gendron et al. | |
|---|---|---|---|---|
| 5,386,568 A | * | 1/1995 | Wold et al. | 717/162 |
| 5,485,617 A | * | 1/1996 | Stutz et al. | 709/315 |
| 5,487,141 A | * | 1/1996 | Cain et al. | 345/764 |
| 5,537,630 A | * | 7/1996 | Berry et al. | 345/763 |
| 5,546,519 A | * | 8/1996 | Berry | 345/763 |
| 5,751,914 A | * | 5/1998 | Coley et al. | 706/47 |
| 5,838,974 A | | 11/1998 | Ritscher et al. | |
| 5,850,548 A | | 12/1998 | Williams | |
| 5,913,063 A | * | 6/1999 | McGurrin et al. | 717/109 |
| 5,946,485 A | | 8/1999 | Weeren et al. | 395/703 |
| 6,131,184 A | | 10/2000 | Weeren et al. | 717/2 |
| 6,173,438 B1 | | 1/2001 | Kodosky et al. | |
| 6,243,861 B1 | * | 6/2001 | Nitta et al. | 717/108 |
| 6,282,699 B1 | | 8/2001 | Zhang et al. | |
| 6,385,769 B1 | * | 5/2002 | Lewallen | 717/125 |
| 6,606,740 B1 | * | 8/2003 | Lynn et al. | 717/100 |

OTHER PUBLICATIONS

Dahl et al. Visual Programming as an interface between program and user. IEEE. 1989. pp. 18–23.*
Kodosky et al. Visual Programming Using Structured Data Flow. IEEE. 1991. pp. 34–39.*
U.S. patent application Ser. No. 09/603,334, Weeren et al., filed Jun. 26, 2000.

* cited by examiner

Primary Examiner—Wei Zhen
(74) Attorney, Agent, or Firm—Fulbright & Jaworksi L.L.P.

(57) ABSTRACT

A simplified programming language is disclosed. The main flow of the program is enclosed in one or more frames. Concurrent operations and asynchronous events that may affect the main program code are attached to the frames as decorations. Operations within the frames may loop or pause until an outside event defined in a decoration causes the main program to exit the frame or to end. Concurrently operating programs may cooperatively exchange data using the decorations. The present language enables software code to be easily updated or modified by changing the decorations that are connected to the program frames.

58 Claims, 5 Drawing Sheets

GRAPHICAL PROGRAMMING LANGUAGE FOR REPRESENTATIONS OF CONCURRENT OPERATIONS

TECHNICAL FIELD

The present invention relates to graphical programming and, more particularly, to a programming environment which simplifies construction of programs that are used to control concurrent operations within a system.

BACKGROUND

Currently, there are two types of implementations to deal with asynchronous events encountered in software programs. One implementation uses a state table to define actions that are to be taken for various events that occur during different states. The other implementation uses multiple wait loops interspersed in the linear flow of the controlling program.

In a pure state table application all of the actions to be taken are defined in a table. Each state may correspond to a number of events, and an action is defined for each state/event combination. Transitions from one state to another state are defined for asynchronous events. When an asynchronous event is detected, the system looks to the state table to determine what transition should be made or what action should be taken. A problem with the state table approach is the size of the table. In a complex system there can be hundreds of states and events. Typically, in a state table there is only one wait loop and a large data structure indicates the transitions among the states. The table essentially contains pointers to sections of code. Every time the system comes to a new state, it goes and executes that section of code. The code is non-interruptible and when it is completed, the system returns to the state table to wait for the next event to occur.

When moving through the data structure in state transitions, the program almost flows randomly. It is difficult to follow this long complicated data structure, thus increasing the complexity in programmers creating/modifying such software programs. Another problem with state tables is that they are difficult to understand. Although the state tables thoroughly specify the problem, state diagrams are not easily understood, thus further increasing the complexity involved with creating/modifying software programs.

In the multiple wait loop applications, instead of going back to a central state wait loop, the program has a more linear flow, thus somewhat aiding the readability of such programs. Typically, if there are any asynchronous events, the program will use a wait loop or wait process in the code. A positive result is that programs have more of a linear flow. The downside is that there can be dozens of these wait loops interspersed within the code. This is because everywhere the program expects an event to occur, it has to be able to handle a number of different events and corresponding actions. Accordingly, following such a wait loop method of the prior art may increase the overall length and complexity of the code, which may result in increased difficulty involved with creating/modifying/debugging such software code.

SUMMARY OF THE INVENTION

The present invention is directed to a graphical programming language which is adapted to simplify coding for programs that must handle asynchronous events in a system having concurrent operations. In a preferred embodiment, such a programming language is utilized to create programs that may control a system, such as telecommunications applications, in which events that affect program operation may occur at random times in a random order. Two or more of cooperative programs may be designed to run concurrently to control separate parts of a single system or to control related portions of two different systems. For instance, such cooperative programs may be capable of exchanging event information that is related to current conditions or actions in the system(s).

The programming language disclosed herein is adapted to run on a graphical development system, such as a processor-based computer system, that may include a display and data storage device, such as random access memory (RAM), hard drive, floppy drive, CD-ROM drive, tape drive, or any other suitable data storage device. Exemplary graphical development environments that may be implemented on such a computer system are disclosed in U.S. Pat. No. 5,946,485 entitled "ENHANCED GRAPHICAL DEVELOPMENT ENVIRONMENT FOR CONTROLLING PROGRAM FLOW," which issued from application Ser. No. 08/599,134, filed Feb. 9, 1996; co-pending and commonly assigned application Ser. No. 09/310,442, filed May 12, 1999, entitled "ENHANCED GRAPHICAL DEVELOPMENT ENVIRONMENT FOR CONTROLLING PROGRAM FLOW;" and co-pending and commonly assigned application serial number 09/603,334, filed Jun. 26, 2000, entitled "ENHANCED GRAPHICAL DEVELOPMENT ENVIRONMENT FOR CONTROLLING PROGRAM FLOW; " the disclosures of which are all hereby incorporated herein by reference.

In a preferred embodiment of the present invention, the main code of the program is written in a linear fashion that includes one or more frames. The program performs the functions defined in the frames while waiting for triggering events to occur. As an example, the main code may be a loop which performs an unlimited number or a set number of repetitive operations until interrupted by a triggering event. On the other hand, the main code frame may perform a function and then suspend until an event is detected. In some cases, the events may cause other programs to run, or they may provide data to other programs. In other cases, the events cause the program to exit the current code frame and to move on to another code frame or to end.

The present language can be graphically represented as having one or more frames of code to which events are associated or "attached." The asynchronous events and their related actions may be referred to as "decorations" herein. An advantage of one aspect of a preferred embodiment of the present invention is the programmer's ability to write the program main code in a linear fashion without initially accounting for any or all interrupting events. Events may then be attached to the main code frame to account for various states that may be detected by the program. Additionally, events may easily be added and/or modified from time to time without requiring extensive modification to the main code. That is, events may be added and/or modified from time to time within the decorations associated with the frames housing the main code for the program's operation. For example, the main code may play a looping series of messages without any defined exit point. However, decorations may be added to the main program frame so that certain specifically defined events will cause the program to take appropriate actions, such as exiting the frame, performing another function, or ending its execution.

One feature that may be recognized by one aspect of a preferred embodiment is that a graphical programming language in which the main program flow is enclosed in one or more frames is provided. The program performs the operations defined by the main code in the frames. Asynchronous events, which affect the main code, are attached to the frames as "decorations." The decorations may cause the main code to move to another frame or to end, as examples. As further examples, the decorations may initiate other programs or perform particular functions.

Another feature that may be recognized by one aspect of a preferred embodiment is that a programming structure in which one or more frames may be nested within another frame with the nested frames inheriting the decorations of the primary (or "main" or "parent") frame is provided.

Yet another feature that may be recognized by one aspect of a preferred embodiment is that a programming structure that simplifies programming for concurrent operations or for asynchronous events is provided. Also, a preferred embodiment of the present invention enables programmers to easily update or modify existing code by changing the decorations associated with (e.g., connected to) each program frame.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

For illustration purposes, a telephone assistant application will be used to describe the present invention and to compare the invention to the prior art programming methods. Of course, it should be understood that the programming techniques disclosed herein are not intended to be limited solely for programs for implementing a telephone assistant system, but may be utilized to implement any type of program. In the telephone assistant example, a caller accesses the system and provides a destination number for a called party and a calling party identification, such as the caller's name. In some embodiments, while one part of the system contacts the called party and inquiries as to how the called party desires to have the call handled, another part of the system plays messages, such as advertisements, to the calling party. Once the called party indicates how he/she desires to have the call handled, the system stops playing messages and the system handles the call in the appropriate manner. This system is similar to an automatic call director (ACD) system for customers who call an understaffed customer service number. While the customers wait for an available agent, they hear a series of messages or advertisements generated by the ACD system.

Figure 1:
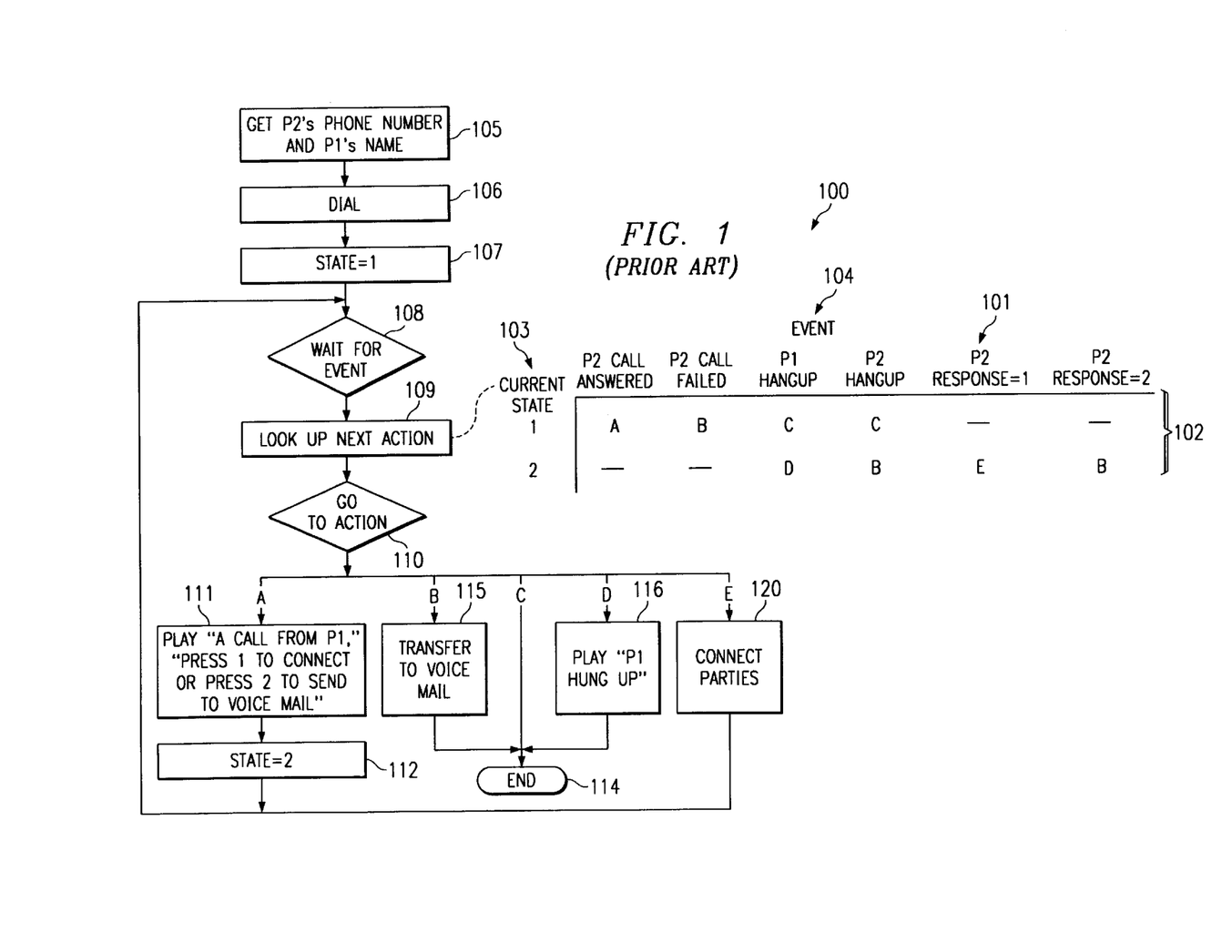
FIG. 1 is a flowchart of a prior art program using a state table method of coding.

FIG. 1 represents a prior art state machine approach to controlling the telephone assistant system. Flow diagram 100 represents a software program for controlling a telephone assistant system using a state diagram for a call received from a calling party P1 to a called party P2. State machine 101 defines a number of actions 102 that occur within program 100 depending upon the current state 103 and system events 104. Program 100 begins in step 105 by receiving from the calling party P1 a destination telephone number (i.e., a telephone number for called party P2) and the name of the calling party P1. In step 106, program 100 dials the destination number. Current state 103 is set to "1" in step 107. In step 108, the system waits for an event 104. Initially, step 108 waits for the results of dialing step 106.

State table 101 lists four possible events that may occur following dialing step 106 (i.e., events that may occur while the current state is "1"): "P2 Call Answered," wherein the called party answers the call from P1; "P2 Call Failed," such as when the called number is busy or is not answered; "P1 Hang Up," wherein the calling party P1 quits before connection to the called party P2; and, "P2 Hang Up," wherein the called party P2 answers the call from the system and hangs up being being connected to caller P1. As shown in State table 101, each of these events corresponds to a specific action, A, B, C, D, or E. After determining the event, in step 109 program 100 looks up the corresponding action in table 101. In step 110, program 100 performs the specific action identified in step 109.

For example, if the calling party P1 hangs up, then the event is "P1 Hang Up" and program 100 will do case )or action) "C" in step 110. In this case, "C" directs program 100 to end in step 114. Likewise, if the called party P2 answers the call and hangs up, then the event is "P2 Hang Up" and program 100 will again perform case "C" in step 110. On the other hand, if an answer is not obtained for the dialed number, then the event will be "P2 Call Failed" and step 110 will do case "B." In step 115, program 100 transfers calling party P1 to a voice mail application for called party P2 and then ends in step 114.

If the dialing step (106) was successful (i.e., Called Party P2 answers), then the event will be "P2 Call Answered" and program 100 will do case "A" in step 110. The system is directed in step 111 to play a message notifying Called Party P2 that the call is from Calling Party P1 and instructing P2 to press 1 to connect the call or press 2 to send the call to P2's voice mail. Program 100 then sets the state to "2" in step 112 and loops back to step 108 to wait for a dual tone multifrequency (DTMF) response from the called party.

When a new event is detected, program 100 looks up the corresponding state "2" action in step 109 and performs that action in step 110. Table 101 illustrates four possible responses to the DTMF prompt of step 112: the called party presses either "1" or "2", the caller P1 disconnects, or the called party P2 disconnects. If the caller P1 disconnects, then the event will be "P1 Hang Up" and step 110 moves to action "D." In step 116, the system plays a message notifying the called party P2 that the caller P1 hung up, and then program 100 ends in step 114. Similarly, if the called party P2 disconnects, then the event will be "P2 Hang Up" and step 110 moves to action B, wherein the calling party P2 is transferred to a voice mail application for called party P2 in step 115 and then program 100 ends in step 114. Likewise, if the called party P2 decides to send the call to voice mail and presses keypad button "2," then the event will be "P2 Response=2" and program 100 will perform action "B" in step 110, wherein the calling party P2 is transferred to a voice mail application for called party P2 in step 115 and ends in step 114.

If the called party indicates a desire to connect the call by pressing "1" following step 12, then the event will be "P2 Response=1" and program 100 will perform action "E" in step 110. In step 120, program 100 completes the connection between the calling party P1 and the called party P2, and then program 100 ends in step 114.

It should be recognized from this example that state table 101 may specify different actions to be taken in response to an event for different states of the program's execution. In an actual telecommunications system, state table 101 would be much bigger having many possible states, events, and actions not illustrated here. As table 101 grows, it is difficult to verify that all of the actions in the table are correct or that each event/state combination produces the desired action. Accordingly, the difficulty and complexity in creating, modifying, and debugging a program that utilizes such a state table becomes undesirably high.

Figure 2:
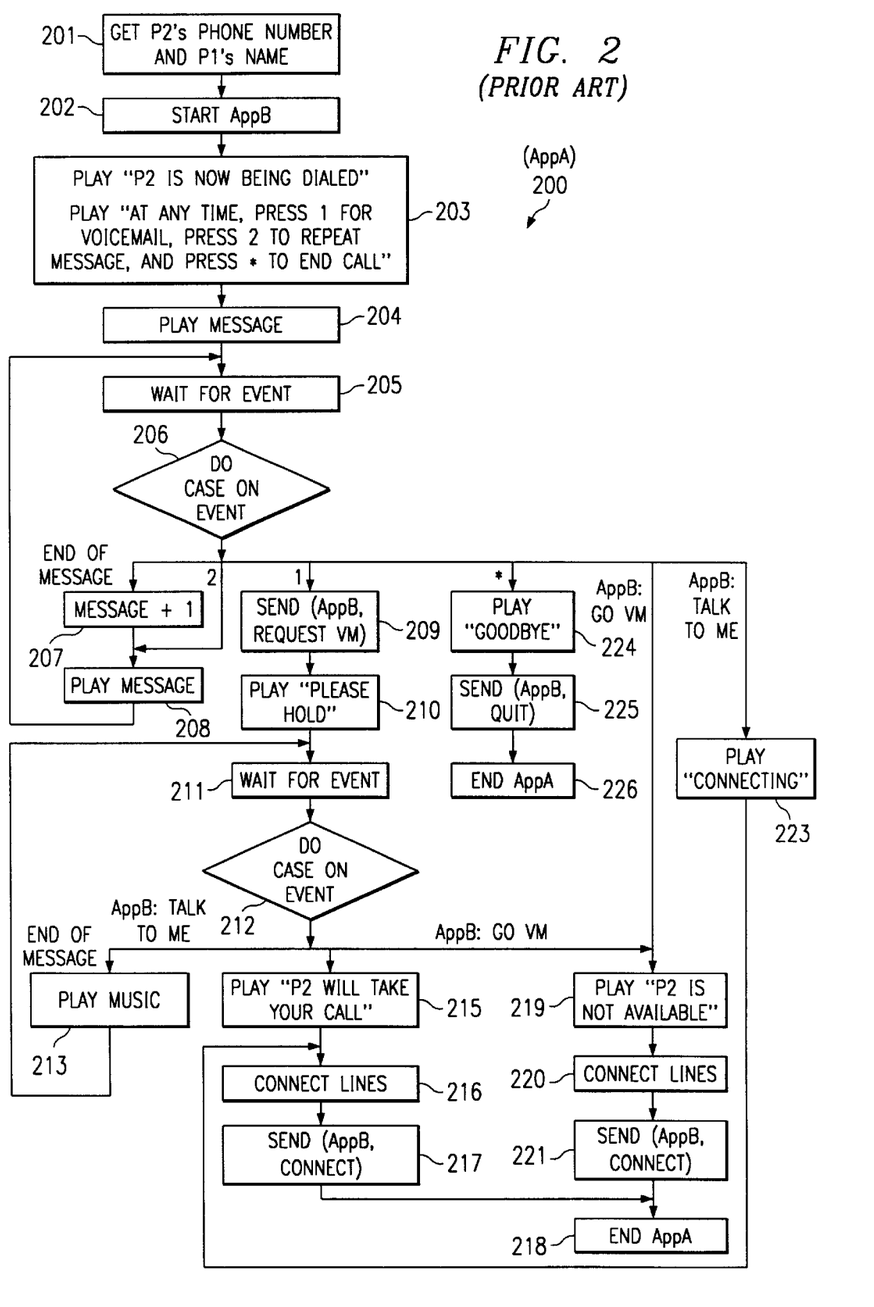
FIG. 2 is a flowchart of a prior art program using a wait loop program.
Figure 3:
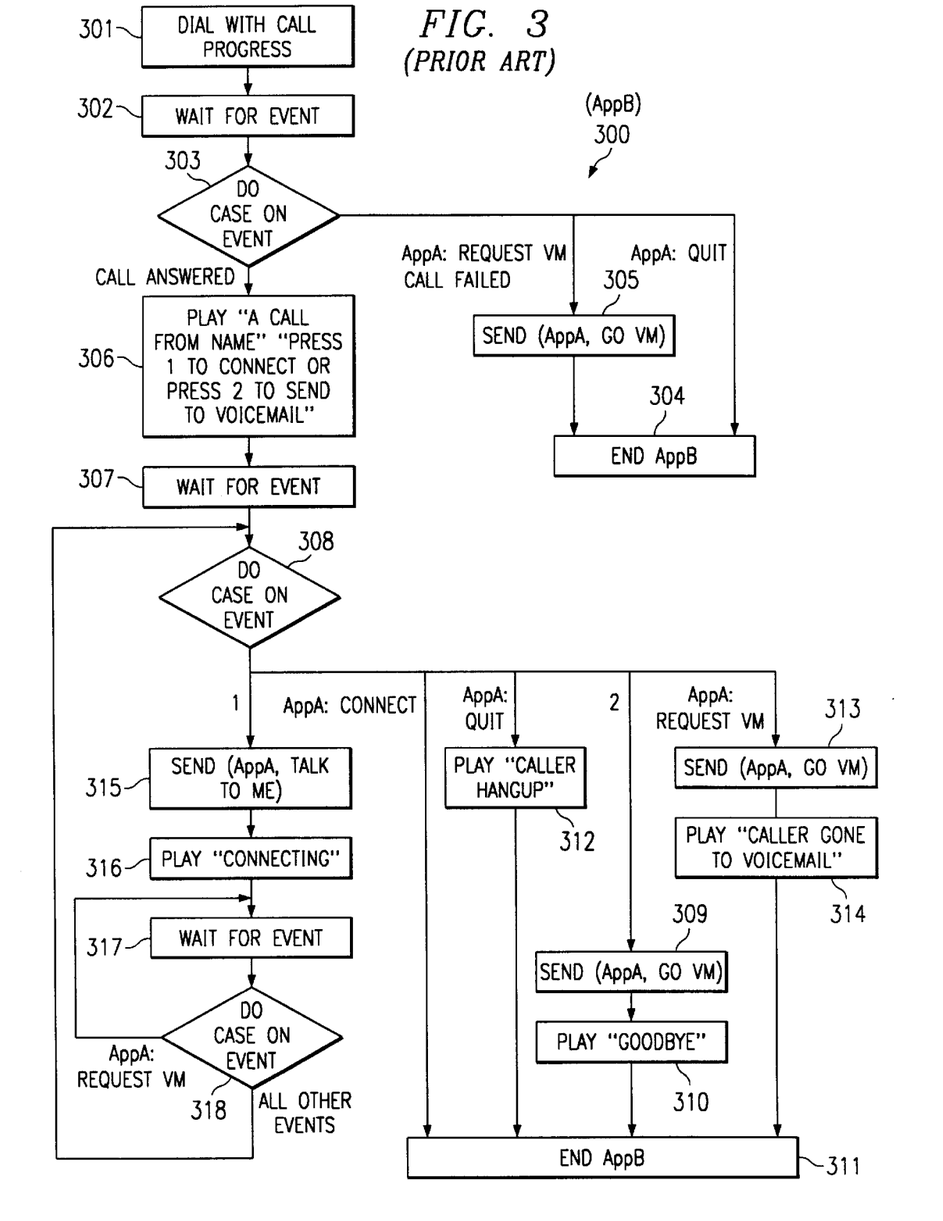
FIG. 3 is a flowchart of a wait loop program of the prior art which operates in conjunction with the program illustrated in FIG. 2.

FIGS. 2 and 3 are flowcharts representing complementary programs 200 and 300 in a telephone assistant system of the prior art. Program 200 (also referred to as "application A" or "App A") illustrates operations related to the caller P1 and program 300 (also referred to as "application B" or "App B") is related to the called party P2. Programs 200 and 300 are event driven applications in which the events are hard-coded into the application so that the programs branch at each event. Program 200 is directed to handling an inbound call to the telephone assistant system. Program 300 is directed to handling outbound calls to called parties. Programs 200 and 300 must exchange data at various times in order to operate properly. The exchanged data corresponds to system events.

Program 200 begins by connecting to a caller P1 at step 201 and obtaining the telephone number of the called party P2 and the name of the caller P1. In step 202, program 200 directs program application 300 (of FIG. 3) to start, and provides P2's telephone number and P1's name to program 300. The operation of program 300 will be discussed in detail below. In step 203, program 200 plays a message for caller P1 notifying P1 that P2 is being dialed, and instructing P1 to press 1 for voice mail, press 2 to repeat a message, or press * to end the call. This allows the caller to access voice mail for called party P2, repeat a message, or end the call during the time that P1 is waiting to be connected to P2. Thus, for example, if caller P1 becomes impatient in holding for called party P2, caller P1 may press 1 to immediately access P2's voice mail. While program 300 attempts to contact the called party, program 200 enters a message loop in step 204. More specifically, the system plays a first message, such as an advertisement, to the caller in step 204. While the message is playing, the system waits for the next event in step 205, and upon detection of an event, program 200 takes the appropriate action in step 206.

There are six possible events in the example system: (1) the message being played finishes (i.e., event "End of msg"), (2) caller P1 enters a DTMF input of "1" (i.e., event "1"), (3) caller P1 enters a DTMF input of "2" (i.e., event "2"), (4) caller P1 enters a DTMF input of "*" (i.e., event "*"), (5) program 300 signals to program 200 to send caller P1 to voice mail (i.e., event "AppB: Go VM"), and (6) program 300 signals to program 200 to connect caller P1 to called party P2 (i.e., event "AppB: Talk to Me"). If the message finishes and there is no DTMF input from caller P1 or program 300 event (i.e., event "AppB: Go VM" or event "AppB: Talk to Me") received by program 200, then program 200 takes the appropriate actions at step 206 for the event "End of msg." That is, program 200 advances to the next message (e.g., the next advertisement) in step 207 and plays such message to caller P1 at step 208. While this next message is playing, program 200's operation returns to step 205 to await the next event.

If, in step 205, caller P1 presses the "2" button on the telephone keypad to input the corresponding DTMF signal (indicating a desire to repeat the current message), program 200 branches to event "2" in step 206, wherein step 208 is performed to play the current message (i.e., to repeat the current message without advancing to the next message). While the message is repeating, program 200's operation returns to step 205 to await the next event.

If, in step 205, caller P1 presses the "1" button on the telephone keypad to input the corresponding DTMF signal (indicating a desire to be transferred to P2's voice mail), program 200 branches to event "1" in step 206. At this point, a request for voice mail is sent from program 200 to program 300 (i.e., "App B") in step 209, and a message to "please hold" is played to caller P1 in step 210. Once the request for voice mail is sent to program 300, program 200 waits to receive an event in step 211, and upon receiving an event, takes the appropriate action in step 212. One event that may be received at this point is an end of the current message that is being played to caller P1, in which program 200 branches to event "End of msg" in step 212 to play music (or other message) to caller P1 in step 213. Once the music is started in step 213, program 200's execution returns to step 211 to await the next event.

Another event that may be received while waiting in step 211 is a response from program 300 to transfer caller P1 to voice mail as requested, in which program 200 branches to event "AppB: Go VM" in step 212. In this case, program 200 plays a message that "P2 is not available" in step 219, connects caller P1 to the voice mail in step 220, sends a message to program 300 that P1 was connected to voice mail in step 221, and then ends its execution in step 218. Yet another event that may be received while waiting in step 211 is a response from program 300 to connect caller P1 with called party P2. That is, while awaiting to be connected to voice mail, called party P2 may indicate to program 300 that P2 desires to connect with P1. In this case, program 200 receives notification from program 300 of P2's desire to connect to caller P1, and branches to event "AppB: Talk to Me" in step 212. In response to this event, program 200 plays a message that "P2 will take your call" in step 215, connects caller P1 to called party P2 in step 216, sends a message to program 300 that P1 was connected to P2 in step 217, and then ends its execution in step 218.

If, in step 205, caller P1 presses the "*" button on the telephone keypad to input the corresponding DTMF signal (indicating a desire to end the call), program 200 branches to event "*" in step 206. At this point, program 200 plays a "goodbye" message to caller P1 in step 224, sends a "QUIT" message to program 300 in step 225, and ends its execution in step 226.

Alternatively, program 200 may receive a response from program 300 in step 205. More specifically, program 200 may receive one of two different event messages from program 300 in step 205: (1) successful connection to called party P2 (i.e., event "AppB: Talk to Me"), or (2) called party P2 refused the call (i.e., event "AppB: Go VM"). If called party P2 accepts the call, then program 200 receives a message from program 300 to this effect and branches to event "AppB: Talk to Me" in step 206, wherein program 200 plays a "connecting" message in step 223, connects caller P1 to called party P2 in step 216, sends a message to program 300 that P1 was connected to P2 in step 217, and then ends its execution in step 218. If, on the other hand, called party P2 refuses the call, then program 200 receives a message from program 300 to this effect and branches to event "AppB: Go VM" in step 206, wherein program 200 plays a message that "P2 is not available" in step 219, connects caller P1 to the voice mail in step 220, sends a message to program 300 that P1 was connected to voice mail in step 221, and then ends its execution in step 218.

It should be recognized from this example that program 200 may specify different actions to be taken in response to events detected within different wait loops. For instance, in the example of FIG. 2, if event "AppB: Talk to Me" is received while waiting in step 205, a first action is taken, and if event "AppB: Talk to Me" is received while waiting in step 211, a different action is taken. More specifically, if event "AppB: Talk to Me" is received while waiting in step 205, program 200's execution performs operational steps 223, 216, 217, then 218, but if event "AppB: Talk to Me" is received while waiting in step 211, then program 200's execution performs operational steps 215, 216, 217, then 218. It should also be recognized that as the number of wait loops implemented within program 200 increases, the difficulty and complexity associated with evaluating the logical flow of the program to create, modify, or debug such program becomes undesirably high.

Program 300 begins in step 301 after receiving the called party's telephone number and the caller's identification from program 200. After dialing the called party's number in step 301, program 300 waits in step 302 for the next event. There are four potential events in step 302: (1) the call is successfully answered (i.e., event "Call Answered"), (2) a request to be transferred to P2's voice mail is received from program 200 (i.e., event "App: Request VM"), (3) the call fails because the call is not answered or a busy signal is encountered (i.e., event "Call Failed"), or (4) caller P1 terminates his or her connection (i.e., event "App: Quit").

If caller P1 has entered "*" in step 205 of program 200, then in step 225 the "QUIT" message is sent to program 300. If this message is received in step 302, then program 300 branches to event "App: Quit" in step 303, wherein program 300 ends in step 304. If caller P1 has entered "1" in step 205 of program 200, then in step 209 a request for voice mail is sent to program 300. If this message is received in step 302, then program 300 branches to event "App: Request VM" in step 303, wherein program 300 sends a message to program 200 to connect caller P1 to voice mail in step 305 and ends its execution in step 304. Similarly, if the attempt to call the destination phone number fails, (e.g., no answer is obtained) then program 300 branches to event "Call Failed" in step 303, wherein program 300 sends a message to connect caller P1 to voice mail in step 305 and ends its execution in step 304.

If, on the other hand, a successful answer is achieved in step 302, then program 300 branches to event "Call Answered" in step 303, wherein program 300 plays a message notifying P2 of "a call from P1" and directing P2 to "press 1 to connect or press 2 to send to voice mail" in step 306. Thereafter, program 300 waits in step 307 for the next event. There are five potential events that may be received in step 307: (1) called party P2 presses "1" (i.e., event "1"), (2) called party P2 presses "2" (i.e., event "2"), (3) a message received from program 200 that caller P1 is requesting to be transferred to P2's voice mail (i.e., event "AppA: Request VM"), (4) a message received from program 200 that caller P1 has successfully connected to P2's voice mail (i.e., event "App: Connect"), or (5) a message received from program 200 that caller P1 has terminated the call (i.e., event "AppA: Quit").

If called party P2 presses "2" in step 307 of program 300, then program 300 branches to event "2" in step 308, wherein program 300 sends a message to program 200 to transfer caller P1 to P2's voice mail in step 309, plays a "goodbye" message to called party P2 in step 310, and ends its execution in step 311. If in step 307 program 300 receives a message from program 200 that caller P1 has been connected to P2's voice mail, then program 300 branches to event "AppA: Connect" in step 308, wherein program 300 ends its execution in step 311. Similarly, if in step 307 program 300 receives a message from program 200 that caller P1 has terminated the call, then program 300 branches to event "App: Quit" in step 308, wherein program 300 plays a message that "caller P1 hung up" to called party P2 in step 312 and ends its execution in step 311.

If in step 307 program 300 receives a message from program 200 that caller P1 requests to be transferred to P2's voice mail, then program 300 branches to event "AppA: Request VM" in step 308, wherein program 300 sends a message to program 200 to transfer caller P1 to P2's voice mail in step 313, plays a message that "caller P1 has gone to voice mail" to called party P2 in step 314, and ends its execution in step 311. If, on the other hand, called party P2 presses "1" in step 307 of program 300, then program 300 branches to event "1" in step 308, wherein program 300 sends a message to program 200 to connect caller P1 to called party P2 in step 315, plays a "connecting" message to called party P2 in step 316, and then waits for the next event to be received in step 317. Once program 200 connects caller P1 to called party P2, program 200 returns a message to program 300, which is identified as an "AppA: Connect" event. If in step 317 program 300 receives a message from program 200 that caller P1 desires to be transferred to P2's voice mail, then program 300 branches to event "AppA: Request VM" in step 318, which ignores the request for voice mail and returns to wait in step 317. That is, once P2 has indicated a desire to accept P1's call, a subsequently received request from P1 to be transferred P2's voice mail will be ignored because P1 will instead be connected with P2. In the event that some other event is received in step 317, such as "AppA: Connect" or "App: Quit," then program 300 branches to step 308 to execute the appropriate action for such event in the manners discussed above.

It should be recognized from this example that program 300 may specify different actions to be taken in response to events detected within different wait loops. For instance, in the example of FIG. 3, if event "AppA: Request VM" is received while waiting in step 302, a first action is taken, if event "AppA: Request VM" is received while waiting in step 307, a different action is taken, and if event "AppA: Request VM" is received while waiting in step 317, yet a different action is taken. More specifically, if event "App: Request VM" is received while waiting in step 302, program 300's execution performs operational steps 305 then 304, if event "AppA: Request VM" is received while waiting in step 307, then program 300's execution performs operational steps 313, 314, then 311, and if event "AppA: Request VM" is received while waiting in step 317, no operational steps are performed by program 300 in response thereto. As with program 200, it should be recognized that as the number of wait loops implemented within program 300 increases, the difficulty and complexity associated with evaluating the logical flow of the program to create, modify, or debug such program becomes undesirably high.

Figure 4:
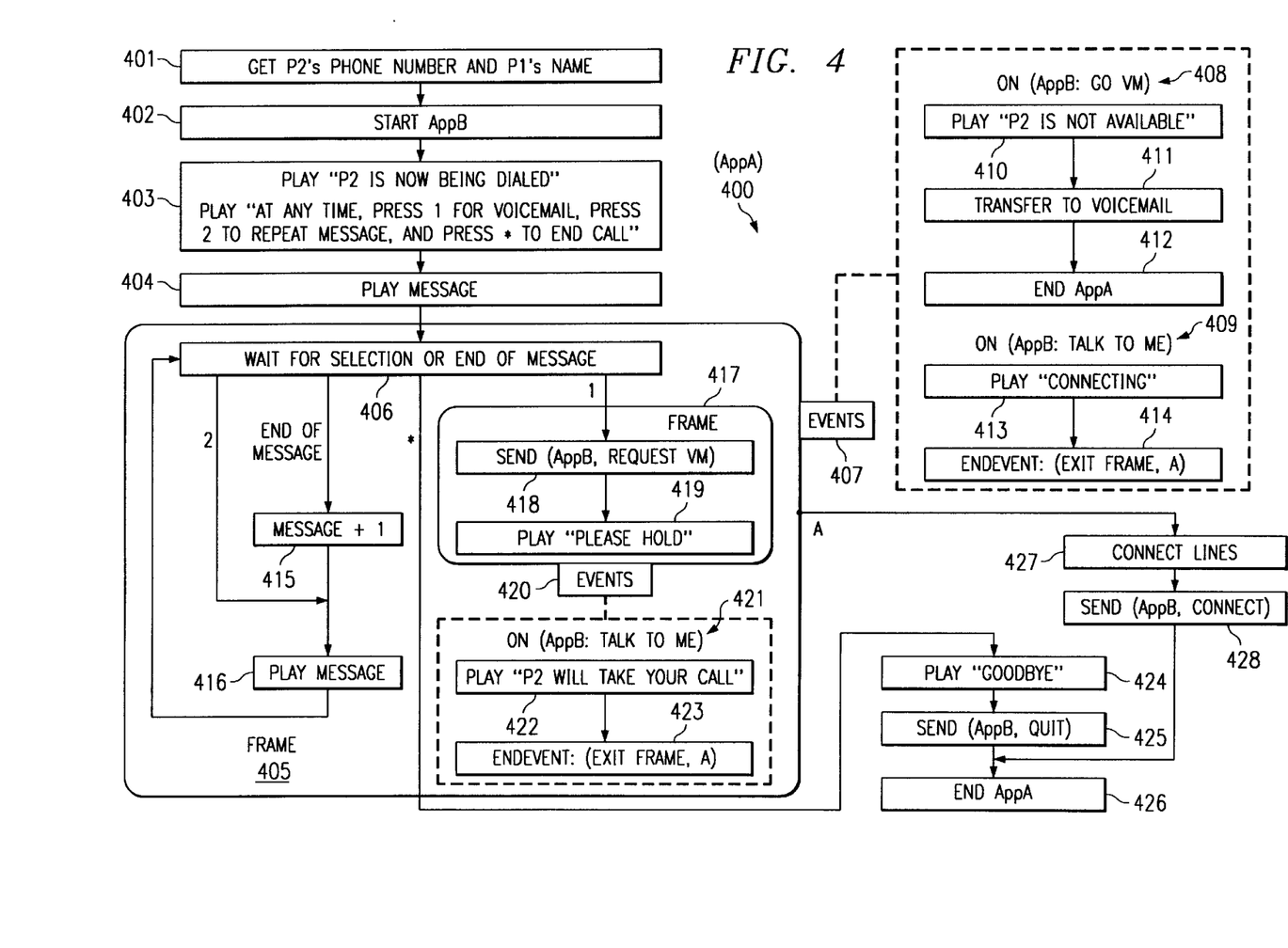
FIG. 4 is an exemplary flow diagram of a program embodying the programming method of a preferred embodiment the present invention.
Figure 5:
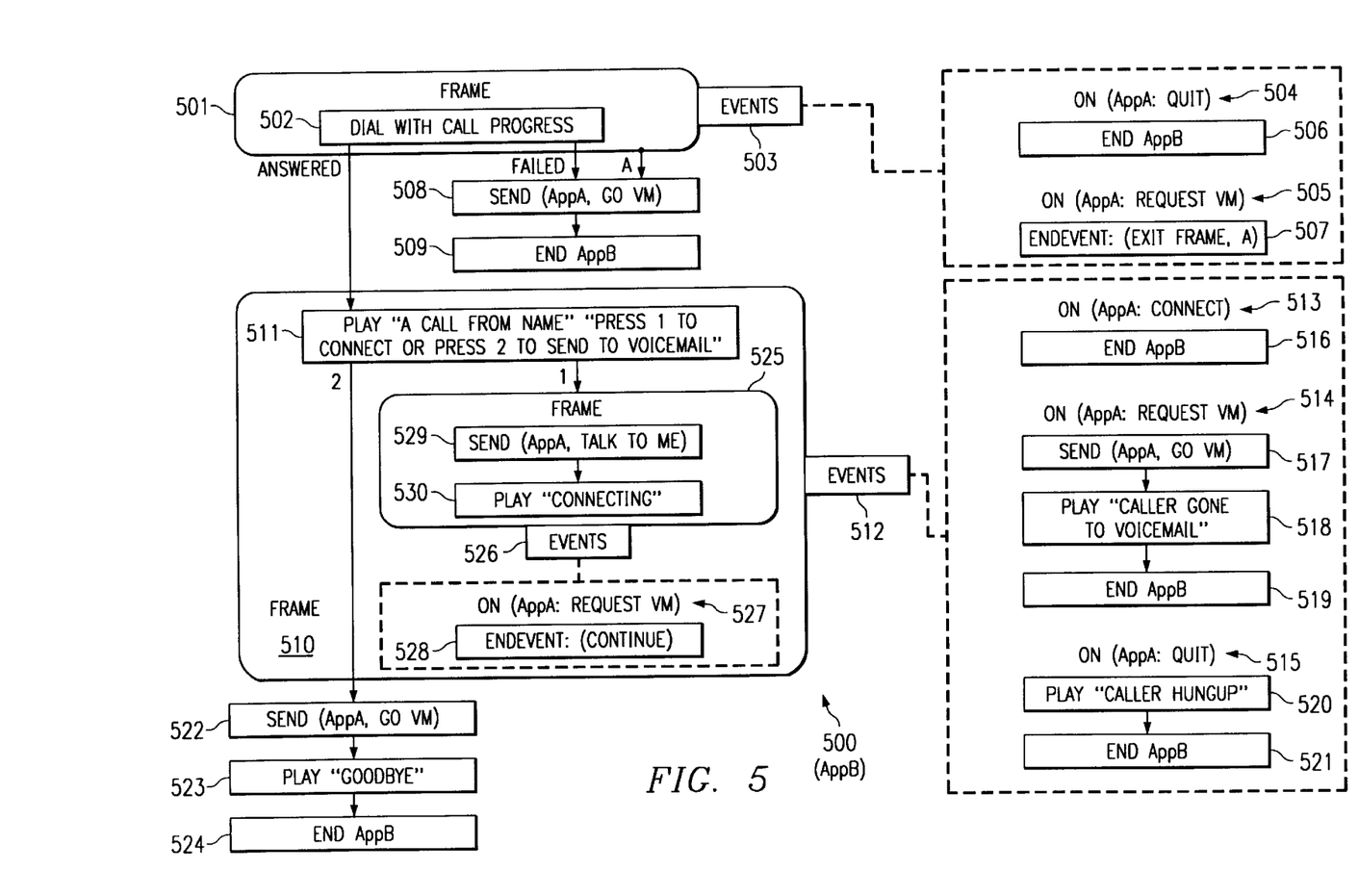
FIG. 5 is an exemplary flow diagram of a program which operates in cooperation with the program of FIG. 4 in a preferred embodiment.

FIGS. 4 and 5 are also related to a single telecommunications system, and provide exemplary flow diagrams showing an exemplary operational flow of software programs that may be implemented in a preferred embodiment of the present invention. Exemplary flow diagram 400 of FIG. 4 represents an exemplary program that controls the system's interaction with the caller P1. Exemplary flow diagram 500 of FIG. 5 represents an exemplary program for interacting with the called party P2. In a preferred embodiment, programs 400 and 500 cooperatively exchange information during operation. However, instead of using a state table or a program having multiple wait loops, as is commonly utilized in prior art programs, programs 400 and 500 of a preferred embodiment use a frame language structure. In a preferred embodiment of the present invention, the main program operation is embodied in a logical frame to which special case and event "decorations" are attached. The decorations are not part of the flow of the main program and they may or may not cause the main program to end. In some cases, the decorations may activate another program frame.

Program 400 (which may also be referred to hereafter as "application A" or "App A") begins by obtaining the telephone number for a called party P2 and identification of the caller P1 (e.g., P1's name or other identification) in step 401. In step 402, program 500 (which may also be referred to hereafter as "application B" or "App B") may be initiated (if not already executing), and this information is provided to program 500. An exemplary operation of program 500 of a preferred embodiment is disclosed in greater detail hereafter in conjunction with FIG. 5. In step 403, program 400 may play a message to caller P1 notifying P1 that "P2 is now being dialed," and further notifying P2 that he/she may "press 1 for voice mail, press 2 to repeat a message, or press * to end this call." Of course, other methods of input may be recognized by program 400 as well, such as voice recognition enabling caller P1 to speak commands to program 400. This allows caller P1 to access voice mail for called party P2, repeat a message, or end the call while P1 is waiting to be connected to P2. Thus, for example, if caller P1 becomes impatient in holding for called party P2, caller P1 may press 1 to immediately access P2's voice mail. While program 500 attempts to contact called party P2, program 400 may begin playing a first message, such as an advertisement, to caller P1 in step 404.

Program 400 then enters frame 405 (which may be referred to herein as a "main frame" or "parent frame"), and waits in step 406 for input by caller P1, the end of the current message being played, or some other event to occur. If the message being played finishes, then program 400 detects an "End of msg" event and takes the appropriate actions. That is, program 400 advances to the next message (e.g., the next advertisement) in step 415 and plays such message to caller P1 at step 416. While this next message is playing, program 400's operation returns to step 406 to await the next event.

If, in stepn 406, caller P1 presses the "2" button on the telephone keypad to input the corresponding DTMF signal (indicating a desire to repeat the current message), program 400 branches to event "2," wherein step 416 is performed to play the current message (i.e., to repeat the current message without advancing to the next message). While the message is repeating, program 400's operation returns to step 406 to await the next event.

If, in step 406, caller P1 presses the "*" button on the telephone keypad to input the corresponding DTMF signal (indicating a desire to end the call), program 400 branches to event "*." At this point, program 400 exits frame 405, and advances its execution to step 424 to play a "goodbye" message to caller P1. Program 400 then sends a "QUIT" message to program 500 in step 425, and ends its execution in step 426.

As shown, frame 405 may have particular events, such as events 407, associated with it, which may be detected and handled by program 400 while executing within frame 405. More specifically, events 407 associated with frame 405 may define the events that frame 405 is to intercept and the actions to be taken in response to such events. Thus, a preferred embodiment provides a graphical development environment in which such associated events may be shown as being associated with frame 405, e.g., associated events may be shown as being attached to frame 405. For instance, in FIG. 4 events 407 may be graphically represented as being attached to frame 405. The asynchronous events 407 and their related actions may be referred to herein as "decorations" to an associated frame. As shown in FIG. 4, events 407 include event 408 (i.e., event "On (AppB: Go VM)"), which is triggered when a message to transfer P1 to voice mail is received by program 400 from program 500. Events 407 further include event 409 (i.e., event "On (AppB: Talk to Me)"), which is triggered when a message to connect caller P1 to called party P2 is received by program 400 from program 500.

For instance, if a message to transfer caller P1 to voice mail is received by program 400 from program 500 while program 400's execution is within frame 405, then event 408 (i.e., event "On (AppB: Go VM)") is triggered. In response to event 408, program 400 plays a message to caller P1 that "P2 is not available" in step 410, transfers caller P1 to P2's voice mail in step 411, and ends its execution in step 412. If, on the other hand, a message to connect caller P1 to called party P2 is received by program 400 from program 500 while program 400's execution is within frame 405, then event 409 (i.e., event "On (AppB: Talk to Me)") is triggered. In response to event 409, program 400 pays a "connecting" message to caller P1 in step 413, and then exits frame 405 to follow execution path "A" to advance its operation to step 427 to connect caller P1 to called party P2. Thereafter, in step 428, program 400 sends a message to program 500 that caller P1 has been connected to called party P2, and then program 400 ends its execution in step 426.

As shown in the example of FIG. 4, a preferred embodiment enables main code to be included in one or more frames, which may be arranged in a logical, linear fashion, and decorations defining various events and responsive actions to such events may be associate with (e.g., attached to) such frames. For instance, frame 405 includes the "main" code for program 400, which specifies the actions to take when a caller inputs a "1," "2," or "*" or the end of message is reached, and decoration 407 is associated with frame 405, which defines various events and responsive actions to take for such events. In the example of FIG. 4, decoration 407 includes events that may be triggered by messages received from complementary program 500. Thus, a preferred embodiment enables decorations defining various events and responsive actions to be associated with frames that include "main" code, thereby enabling a programmer to easily add/modify/debug such events and/or responsive actions without being required to modify the "main" code included within the associated frame.

If, in step 406 of program 400, caller P1 presses the "1" button on the telephone keypad to input the corresponding DTMF signal (indicating a desire to be transferred to P2's voice mail), program 400 branches to event "1," thereby entering frame 417 (which may be referred to herein as a "sub-frame," "nested frame," or "child frame"). It should be recognized that frame 417 is nested or contained within frame 405, and therefore inherits features of frame 405 (i.e., inherits features of its "parent frame"). Thus, frame 417 operates as part of coding within program 405, within which it is contained. Once program 400's execution enters frame 417 it sends a request for voice mail to program 500 in step 418 and plays a message to "please hold" to caller P1 in step 419. As with frame 405, frame 417 may have particular events, such as events 420, associated with it, which may be detected and handled by program 400 while executing within frame 417. Thus, as discussed above, a preferred embodiment provides a graphical development environment in which such associated events may be shown as being associated with frame 417, e.g., associated events may be shown as being attached to frame 417. For instance, in FIG. 4 events 420 may be graphically represented as being attached to frame 417. Again, such asynchronous events 420 and their related actions may be referred to herein as "decorations" to an associated frame (e.g., events 420 and their related actions may be referred to herein as decorations to frame 417).

As shown in FIG. 4, events 420 include event 421 (i.e., event "On (AppB: Talk to Me)"), which is triggered when a message to connect caller P1 to called party P2 is received by program 400 from program 500. If such event 421 is detected by program 400 while it is executing within frame 417, program 400 advances its operation to step 422 to play a message to caller P1 that "P2 will take your call" in step 422. Thereafter, event 421 is ended and the program's execution exits both frame 417 and frame 405 along execution path "A" to connect caller P1 to called party P2 in step 427. Thereafter, in step 428, program 400 sends a message to program 500 that caller P1 has been connected to called party P2, and then program 400 ends its execution in step 426.

It should be recognized that events 420 associated with frame 417 may include events that are also included within events 407 associated with frame 407, and different actions to be taken may be specified for such events by such "decorations" of frames 405 and 417. For example, in FIG. 4 events 409 and 421 are the same events (i.e., event "On (AppB: Talk to Me)"). That is, both events 409 and 421 are triggered upon program 400 receiving a message from program 500 to connect caller P1 to called party P2. However, if program 400's execution is within parent frame 405 but not within child frame 417, a first action is taken (e.g., steps 413 and 414 are performed) as specified by decoration 407 and if program 400's execution is within child frame 417, a different action is specified by decoration 420 (e.g., steps 422 and 423 are performed). Accordingly, in a preferred embodiment, a child frame may have associated decorations that alter the actions to be taken upon detection of an event from the actions that are specified for such event by decorations associated with a parent frame.

Additionally, in a preferred embodiment, child frame 417 may inherit certain decorations that are associated with its parent frame 405. For example, in FIG. 4 event 408 (i.e., event "On (AppB: Go VM)") is included within events (or decorations) 407 associated with frame 405, but such event 408 is not included within events (or decorations) 420 associated with frame 417. Thus, since frame 417 does not have associated decorations specifying actions to be taken upon detection of event 408, frame 417 inherits the actions to be taken for such event from frame 405. Accordingly, in a preferred embodiment, if while program 400 is executing in frame 417, it receives a message from program 500 to send caller P1 to voice mail (i.e. event "On (AppB: Go VM)"), then the actions specified by decorations 407 for such event will be performed. That is, program 400's execution will advance to step 410 and plays a message to caller P1 that "P2 is not available," then transfers caller P1 to P2's voice mail in step 411, and ends its execution in step 412. In this case, frame 417 inherits the actions to be triggered by an event from decorations 407 associated with frame 405.

Turning now to FIG. 5, an exemplary operational flow diagram is shown for program 500. In a preferred embodiment, frame 501 (which may be referred to as a "main" or "parent" frame) is activated by step 402 in program 400. In step 502, program 500 dials the called party number provided by the caller P1. In a most preferred embodiment, frame 501 is suspended (or waits) until the results of dialing step 502 have been determined or some other event is detected. In a most preferred embodiment of the present invention, suspend steps (not shown) are used to hold the main logical frames pending an event outside the frame. In the example of FIG. 5, four potential events may be detected while program 500 is executing in frame 501: (1) the call to party P2 may be answered (i.e., event "Answered"), (2) the call to party P2 may fail, such as no answer received or a busy signal detected, (i.e., event "Failed"), (3) a message may be received by program 500 from program 400 that caller P1 has terminated the call (i.e., event "On (App: Quit)"), and (4) a message may be received by program 500 from program 400 that caller P1 has requested to be transferred to voice mail (i.e., event "On (App: Request VM)").

As shown, frame 501 may have particular events, such as events 503, associated with it, which may be detected and handled by program 500 while executing within frame 501. More specifically, events 503 associated with frame 501 may define the events that frame 501 is to intercept and the actions to be taken in response to such events. Thus, a preferred embodiment provides a graphical development environment in which such associated events may be shown as being associated with frame 501, e.g., associated events may be shown as being attached to frame 501. For instance, in FIG. 5 events 503 may be graphically represented as being attached to frame 501. As described above, the asynchronous events 503 and their related actions may be referred to herein as "decorations" to an associated frame. As shown in FIG. 5, events (or decorations) 503 include event 504 (i.e., event "On (AppA: Quit)"), which is triggered when a message is received by program 500 from program 400 that caller P1 has terminated the call. Events (or decorations) 503 further include event 505 (i.e., event "On (AppA: Request VM)"), which is triggered when a message is received by program 500 from program 400 that caller P1 has requested to connect to P2's voice mail.

For instance, if a message that caller P1 has terminated the call is received by program 500 from program 400 while program 500's execution is within frame 501, then event 504 (i.e., event "On (AppA: Quit)") is triggered. In response to event 504, program 500 terminates its execution in step 506. If, on the other hand, a message that caller P1 has requested to connect to P2's voice mail is received by program 500 from program 400 while program 500's execution is within frame 501, then event 505 (i.e., event "On (AppA: Request VM)") is triggered. In response to event 505, program 500 advances its execution to step 507, in which program 500 ends the event and exits frame 501 to follow execution path "A" to advance its operation to step 508 to send a message to program 400 to connect caller P1 to P2's voice mail. Thereafter, in step 509, program 500 ends its execution.

If the call placed to party P2 in step 502 is determined to fail (e.g., no answer is received or a busy signal is detected), program 500 exits frame 501 and advances its execution to step 508 to send a message to program 400 to connect caller P1 to P2's voice mail. Thereafter, in step 509, program 500 ends its execution. If, on the other hand, the call placed to party P2 in step 502 is determined to be answered, program 500 exits frame 501 and advances its execution to enter frame 510 (e.g., another "main" or "parent" frame). In the example of FIG. 5, frame 510 controls the real-time interaction between program 500 and the called party P2. Once execution enters frame 510, program 500 plays a message to the answering party P2 notifying P2 of the "call from P1," and informing P2 that P2 may "press 1 to connect with P1 or press 2 to send P1 to voice mail" in step 511.

As with frame 501, frame 510 may have particular events, such as events 512, associated with it, which may be detected and handled by program 500 while executing within frame 510. More specifically, events 512 associated with frame 510 may define the events that frame 510 is to intercept and the actions to be taken in response to such events. As described above, the asynchronous events 512 and their related actions may be referred to herein as "decorations" to an associated frame. As shown in FIG. 5, events (or decorations) 512 include event 513 (i.e., event "On (AppA: Connect)"), which is triggered when a message is received by program 500 from program 400 that caller P1 has been connected with party P2 or to P2's voice mail. Events (or decorations) 512 further include event 514 (i.e., event "On (AppA: Request VM)"), which is triggered when a message is received by program 500 from program 400 that caller P1 has requested to connect to P2's voice mail, and events (or decorations) 512 include event 515 (i.e., event "On (App: Quit)"), which is triggered when a message is received by program 500 from program 400 that caller P1 has terminated the call.

For instance, if a message that caller P1 has terminated the call is received by program 500 from program 400 while program 500's execution is within frame 510, then event 515 (i.e., event "On (AppA: Quit)") is triggered. In response to event 515, program 500 plays a message to party P2 notifying P2 that "caller P1 hung up" in step 520, and terminates its execution in step 521. If, on the other hand, a message that caller P1 has requested to connect to P2's voice mail is received by program 500 from program 400 while program 500's execution is within frame 510, then event 514 (i.e., event "On (App: Request VM)") is triggered. In response to event 514, program 500 advances its execution to step 517, in which program 500 sends a message to program 400 instructing program 400 to connect caller P1 to P2's voice mail in step 517. Program 500 then plays a message to party P2 notifying P2 that "caller P1 has been transferred to voice mail" in step 518, and it ends its execution in step 519. As yet another alternative, if a message that caller P1 has been successfully connected (e.g., to party P2 or to P2's voice mail) is received by program 500 from program 400 while program 500's execution is within frame 510, then event 513 (i.e., event "On (AppA: Connect)") is triggered. In response to event 513, program 500 advances its execution to step 516, in which program 500 ends its execution.

It should be recognized that frame 510 is not nested within frame 501, and therefore does not inherit features of frame 501. Thus, frame 510 may have particular events (or decorations) independently defined for it, apart from how such events may be defined for frame 501. Thus, for example, frame 510 may have particular events associated with it, which may be defined in the same or a different manner than for frame 501. For instance, as shown in the example of FIG. 5, decorations 503 assigned to frame 501 include events 504 and 505, and decorations 512 assigned to frame 510 include events 513, 514, and 515. It should be recognized that in FIG. 5 events 504 and 515 are the same events (i.e., event "On (AppA: Quit)"), and events 505 and 514 are the same events (i.e., event "On (AppA: Request VM)"). That is, both events 504 and 515 are triggered by program 500 receiving a message from program 400 that caller P1 has terminated the call, and both events 505 and 514 are triggered by program 500 receiving a message from program 400 that caller P1 has requested to be transferred to P2's voice mail. However, if program 500's execution is within frame 501, a first action may be taken for a detected event, and if program 500's execution is within frame 510 a different action may be taken for the same detected event. For instance, in FIG. 5 if program 500's execution is within frame 501 when a message is received from program 400 that caller P1 has terminated the call (i.e., event "On (AppA: Quit)"), then program 500 ends its execution in step 506. However, if program 500's execution is within frame 510 when a message is received from program 400 that caller P1 has terminated the call (i.e., event "On (AppA: Quit)"), then program 500 plays a message to called party P2 that "caller P1 hung up" in step 520 and ends its execution in step 521. Accordingly, in a preferred embodiment, separate, independent frames within a program may have associated decorations that define the same or different actions to be taken upon detection of an event during execution of such frames. Additionally, one or more frames included within a program may not have decorations associated (or attached) with them.

If while program 500's execution is within frame 510, program 500 detects that called party P2 presses the "2" button on the telephone keypad to input the corresponding DTMF signal (indicating a desire that caller P1 be transferred to P2's voice mail), program 500 branches to event "2," thereby exiting frame 510 and advancing its execution to step 522. Program 500 sends a message instructing program 400 to transfer caller P1 to P2's voice mail in step 522. Thereafter, program 500 plays a "goodbye" message to called party P2 in step 523, and ends its execution in step 524.

On the other hand, if while program 500's execution is within frame 510, program 500 detects that called party P2 presses the "1" button on the telephone keypad to input the corresponding DTMF signal (indicating a desire that caller P1 be connected with called party P2), program 500 branches to event "1," thereby entering frame 525 (which may be referred to herein as a "sub-frame," "nested frame," or "child frame"). It should be recognized that frame 525 is nested or contained within frame 510, and therefore inherits features of frame 510 (i.e., inherits features of its "parent frame") in a manner as discussed in FIG. 4 regarding frame 417. Thus, frame 525 operates as part of coding within program 510, within which it is contained. Once program 500's execution enters frame 525 it sends a message to program 400 that called party P2 desires to be connected to caller P1 in step 529, and plays a message notifying called party P2 that it is attempting to "connect" the call in step 530. As with frame 510, frame 525 may have particular events, such as events 526, associated with it, which may be detected and handled by program 500 while executing within frame 525. Again, such asynchronous events 526 and their related actions may be referred to herein as "decorations" to an associated frame (e.g., events 526 and their related actions may be referred to herein as decorations to frame 525).

As shown in FIG. 5, events 526 include event 527 (i.e., event "On (AppA: Request VM)"), which is triggered when a message is received by program 500 from program 400 that caller P1 has requested to be transferred to P2's voice mail. If such event 527 is detected by program 500 while it is executing within frame 525, program 500 advances its operation to step 528 to play a message to end the event continue execution of program 500 as if such event were not detected. That is, if caller P1 requests to be transferred to party P2's voice mail after P2 has indicated that he/she desires to be connected to caller P1, then program 500 ignores the request from program 400 that caller P1 be transferred to P2's voice mail because program 500 is in the process of actually connecting caller P1 to called party P2.

It should be recognized that events 526 associated with frame 525 may include events that are also included within events 512 associated with frame 510, and different actions to be taken may be specified for such events by such "decorations" of frames 510 and 525. For example, in FIG. 5 events 514 and 527 are the same events (i.e., event "On (AppA: Request VM)"). That is, both events 514 and 527 are triggered by program 500 receiving a message from program 400 that caller P1 has requested to be transferred to P2's voice mail. However, if program 500's execution is within parent frame 510 but not within child frame 525, a first action is taken (e.g., steps 517, 518, and 519 are performed), and if program 500's execution is within child frame 525, a different action is specified by events 526 (e.g., step 528 is performed). Accordingly, in a preferred embodiment, a child frame may have associated decorations that alter (or replace) the actions to be taken upon detection of an event from the actions that are specified for such event by decorations associated with a parent frame.

Additionally, in a preferred embodiment, child frame 525 may inherit certain decorations that are associated with its parent frame 510. For example, in FIG. 5 event 513 (i.e., event "On (AppA: Connect)") is included within events (or decorations) 512 associated with frame 510, but such event 513 is not included within events (or decorations) 526 associated with frame 525. Thus, since frame 525 does not have associated decorations specifying actions to be taken upon detection of event 513, frame 525 inherits the actions to be taken for such event from frame 510. For instance, once a connection is achieved between caller P1 and called party P2, program 400 sends a message to program 500 notifying that such a connection was achieved. Accordingly, in a preferred embodiment, if while program 500 is executing in frame 525, program 500 receives a message that such a connection is achieved between caller P1 and called party P2 (i.e., event "On (AppA: Connect)"), then the actions specified by decorations 512 for such event will be performed. That is, program 500's execution will advance to step 516 to end its execution. In this case, frame 525 inherits the actions to be triggered by an event from decorations 512 associated with frame 510.

It will be recognized by one of ordinary skill in the art that the exemplary software programs described above may be executed on any type of processor-based device, including without limitation personal computers (PCs), workstations, laptop computers, personal digital assistants (PDAs), and computer servers (e.g., web servers). It should be understood that the operational flow diagrams of FIGS. 4 and 5 are intended only as examples, and one of ordinary skill in the art will recognize that in alternative embodiments the order of operation for the various steps may be varied, certain steps of operation may be omitted completely, and additional operational steps may be added. Thus, the present invention is not intended to be limited only to the operational flow diagrams of FIGS. 4 and 5 for implementing a telephone assistant system, but rather such operational flow diagrams are intended solely as examples that render the disclosure enabling for many other operational flow diagrams for implementing such a telephone assistant system.

Additionally, although a preferred embodiment has been described above in conjunction with implementing a telephone assistant system, it should be understood that the present invention is not intended to be limited solely to a telephone assistant system. Rather, the programming language (or programming techniques or development environment) disclosed herein may be utilized to implement any type of software programs executable by any type of processor-based device, and any such software programs are intended to be within the scope of the present invention. Thus, while a preferred embodiment is utilized to develop software programs for implementing various telephony applications/systems, various alternative embodiments may be utilized to develop software programs for implementing any type of applications/systems. It should also be understood that various types of syntax usage, object oriented techniques, and other programming techniques now known or later developed may be utilized in implementing the programming language of a preferred embodiment, which enables main code of a software program to be written in a linear fashion that includes one or more frames. As described above, a preferred embodiment enables events (or decorations) to be associated with (e.g., attached to) a frame, and the resulting program performs the functions defined in the frames while waiting for triggering events defined in the associated decorations to occur.

One interesting aspect of a preferred embodiment of the present programming language (or development environment) is the ability to write an essentially infinite loop to execute within a particular frame. For example, a programmer using this language could literally write the loop containing steps 406, 415, and 416 of the exemplary flow diagram of FIG. 4, and have the loop play over and over again. If the loop was not embedded within a frame, it would play forever. However, with frame 405 around it, a preferred embodiment of the present invention allows program 400 to interrupt out of the loop when appropriate. In fact, the programmer will rely on an interrupting event to end the loop flow. Alternatively, well-known coding techniques can be used to make a loop implemented within a frame repeat a specific number of times and then exit (or exit upon a determined condition becoming true).

One advantage of a preferred embodiment of the present computer language is the ability to write the main code without having to worry about interactions or events. Instead of hard-coding particular branches or decision points, a programmer can use specific decorations to handle different events. The language allows programmers to write the code in a linear fashion. A program can be written to perform the main function in a logical frame, such as routing calls or connecting a caller to a voice mail account. Then, other events and interactions can be added as decorations to that frame.

This makes the code easier to write and revise. It will also be easier to update systems and make corresponding modifications to the code. Also, the present language allows a programmer to reuse sections of code that were written without a specific application in mind.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A graphical development environment for execution on a computer system having a display, comprising:
   means for graphically representing a program as a plurality of linked program frames, each frame containing code operable to control one or more main functions of said program; and
   means for graphically representing one or more event-triggered operations corresponding to one or more of said plurality of program frames, said operations graphically associated with said one or more of said plurality of program frames in a manner indicating that said operations are not within a main program flow.

2. The graphical development environment of claim 1 further comprising:
   means for adding additional program frames at any point in said program flow.

3. The graphical development environment of claim 1 further comprising:
   means for adding additional event-triggered operations to any of said program frames.

4. The graphical development environment of claim 1 further comprising:
   means for removing certain program frames from said program flow.

5. The graphical development environment of claim 1 further comprising:
   means for removing certain event-triggered operations from said program frames.

6. The graphical development environment of claim 1 wherein said event-triggered operations comprise code to process a detected event.

7. The graphical development environment of claim 1 wherein said event-triggered operations are triggered upon detection of one or more events representing stimulus which can asynchronously impinge upon the program flow with program actions.

8. The graphical development environment of claim 7 wherein said stimulus originates within a program flow or within an external environment.

9. The graphical development environment of claim 1 wherein one or more of said event-triggered operations initiate a concurrently running program upon detection of a particular event.

10. The graphical development environment of claim 1 wherein, upon detection of a particular event, said event-triggered operations cause said main program flow to exit a program frame to which they are connected and to move to a subsequent program frame.

11. The graphical development environment of claim 1 further comprising one or more named frame exit operations.

12. The graphical development environment of claim 11 wherein said one or more named frame exit operations cause an associated frame's program flow to stop its current operations and resume at a named location.

13. The graphical development environment of claim 11 wherein said one or more named frame exit operations are used by an associated frame's program flow to exit a frame in a desired manner.

14. The graphical development environment of claim 11 wherein said one or more named frame exit operations are used by event-triggered operations to exit a frame in a desired manner.

15. The graphical development environment of claim 11 wherein a frame is defined as having a plurality of exit points, and said one or more named frame exit operations are executable to cause the program flow of such frame having a plurality of exit points to exit at a particular one of said plurality of exit points.

16. The graphical development environment of claim 1 further comprising:
   means for nesting said program frames so that a nested program frame operates as part of coding within a program frame in which said nested program frame is contained.

17. The graphical development environment of claim 16 wherein event-triggered operations associated with a program frame are applicable to frames nested within said program frame, unless such nested frames have their own definition of the event-triggered operations.

18. The graphical development environment of claim 16 wherein said nested program frame inherits said event-triggered operations associated with said frame in which said nested program frame is contained, except for those event-triggered operations defined by said nested program frame; and wherein said nested program frame may include event-triggered operations associated with said nested program frame that are not included in the event-triggered operations associated with said frame in which said nested program frame is contained.

19. The graphical development environment of claim 1 wherein said event-triggered operations are triggered by events originating in a concurrently operating program.

20. The graphical development environment of claim 1 wherein said event-triggered operations receive data from a concurrently operating program.

21. The graphical development environment of claim 1 wherein said event-triggered operations provide data to a concurrently operating program.

22. The graphical development environment of claim 1 wherein said event-triggered operations impinge upon program flow by changing data used by main functions of said program.

23. The graphical development environment of claim 1 wherein said means for graphically representing a program as a plurality of linked program frames and said means for graphically representing one or more event-triggered operations may be utilized for graphically displaying program flows and interactions for a plurality of interrelated programs.

24. The graphical development environment of claim 1 wherein said program is a telecommunications application.

25. A computer program product having a computer readable medium including computer program logic recorded thereon for graphically developing an application, the computer program product comprising:
   code for graphically representing a program as a plurality of linked program frames;
   code for creating executable software code for each of said program frames, said executable software code operable to control one or more functions of said program; and
   code for graphically representing one or more event-triggered operations corresponding to one or more of said program frames, said event-triggered operations graphically associated with one or more of said frames in a manner indicating that said event-triggered operations are not within the program flow of said executable software code of the corresponding frame.

26. The computer program product of claim 25 further comprising:
   code for adding additional program frames at any point in said program flow.

27. The computer program product of claim 25 further comprising:
   code for adding additional event-triggered operations to any of said program frames.

28. The computer program product of claim 25 further comprising:
   code for removing certain program frames from said program flow.

29. The computer program product of claim 25 further comprising:
   code for removing certain event-triggered operations from said program frames.

30. The computer program product of claim 25 wherein said event-triggered operations comprise code to process a detected event.

31. The computer program product of claim 25 wherein said event-triggered operations are triggered upon detection of one or more events representing stimulus which can asynchronously impinge upon the program flow with program actions.

32. The computer program product of claim 31 wherein said stimulus originates within a program flow or within an external environment.

33. The computer program product of claim 25 wherein one or more of said event-triggered operations initiate a concurrently running program upon detection of a particular event.

34. The computer program product of claim 25 wherein, upon detection of a particular event, said event-triggered operations cause said main program flow to exit a program frame to which they are connected and to move to a subsequent program frame.

35. The computer program product of claim 25 further comprising one or more named frame exit operations.

36. The computer program product of claim 35 wherein said one or more named frame exit operations cause an associated frame's program flow to stop its current operations and resume at a named location.

37. The computer program product of claim 35 wherein said one or more named frame exit operations are used by an associated frame's program flow to exit a frame in a desired manner.

38. The computer program product of claim 35 wherein said one or more named frame exit operations are used by a event-triggered operations to exit a frame in a desired manner.

39. The computer program product of claim 35 wherein a frame is defined as having a plurality of exit points, and said one or more named frame exit operations are executable to cause the program flow of such frame having a plurality of exit points to exit at a particular one of said plurality of exit points.

40. The computer program product of claim 25 further comprising:
   code for nesting said program frames so that a nested program frame operates as part of coding within a program frame in which said nested program frame is contained.

41. The computer program product of claim 40 wherein event-triggered operations associated with a program frame are applicable to frames nested within said program frame, unless such nested frames have their own definition of the event-triggered operations.

42. The computer program product of claim 40 wherein said nested program frame inherits said event-triggered operations associated with said frame in which said nested program frame is contained, except for those event-triggered operations defined by said nested program frame; and wherein said nested program frame may include event-triggered operations associated with said nested program frame that are not included in the event-triggered operations associated with said frame in which said nested program frame is contained.

43. The computer program product of claim 25 wherein said event-triggered operations arc triggered by events occurring in a concurrently operating program.

44. The computer program product of claim 25 wherein said event-triggered operations receive data from a concurrently operating program.

45. The computer program product of claim 25 wherein said event-triggered operations provide data to a concurrently operating program.

46. The computer program product of claim 25 wherein said event-triggered operations impinge upon program flow by changing data used by main functions of said program.

47. The computer program product of claim 25 wherein said means for graphically representing a program as a plurality of linked program frames and said means for graphically representing one or more event-triggered operations may be utilized for graphically displaying program flows and interactions for a plurality of interrelated programs.

48. The computer program product of claim 25 wherein said program is a telecommunications application.

49. A method of developing an application on a processor-based computer system having a display, comprising:
   providing computer executable software code for one or more program frames comprising code for performing one or more functions of said application, said one or more program frames being represented graphically; and providing one or more event-triggered operations associated with one or more of said frames, said one or more event-triggered operations being represented graphically, said operations graphically associated with said one or more said frames in a manner indicating that said operations are not within a main program flow.

50. The method of claim 49 further comprising:

interconnecting a plurality of said program flames.

51. The method of claim 49 further comprising:

changing said program flow by adding additional program frames.

52. The method of claim 49 further comprising:

changing said application by adding additional event-triggered operations to one or more of said frames.

53. The method of claim 49 wherein said event-triggered operations comprise:

initiating a concurrently operating program.

54. The method of claim 53 wherein said concurrently operating program exchanges data with said application.

55. The method of claim 49 further comprising:

graphically representing a first program frame as being nested within a second program frame.

56. The method of claim 55 wherein said first program frame inherits said event-triggered operations associated with said second program frame, except for any event-triggered operations for which said first program frame has its own definition.

57. The method of claim 49 further comprising the step of:

graphically displaying program flows for two interrelated programs corresponding to a single application.

58. The method of claim 49 wherein said event-triggered operations are asynchronous.

* * * * *